Aug. 22, 1933.　　　O. C. REEVES　　　1,923,457
TEST WEIGHT CASE
Filed Nov. 3, 1930
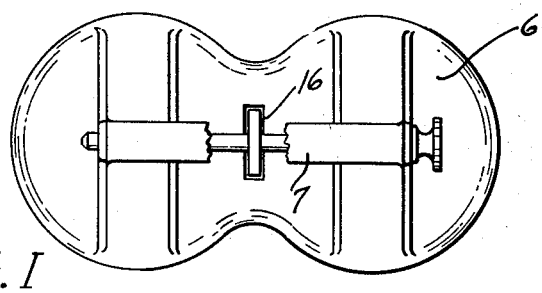
FIG. I
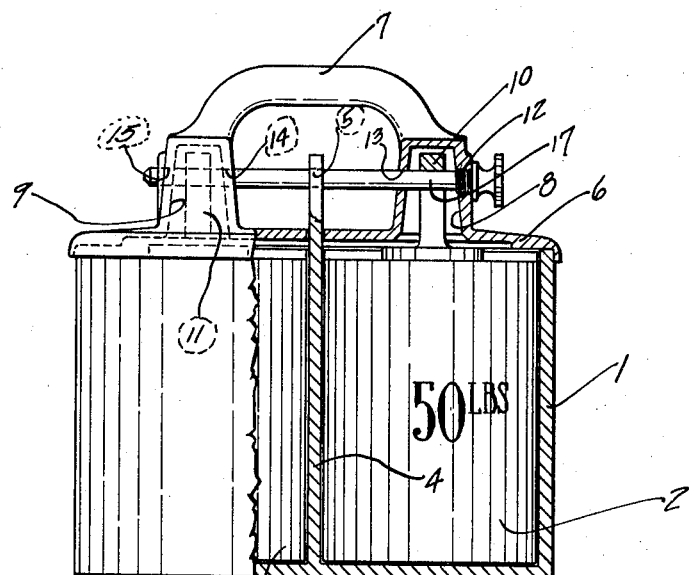
FIG. II
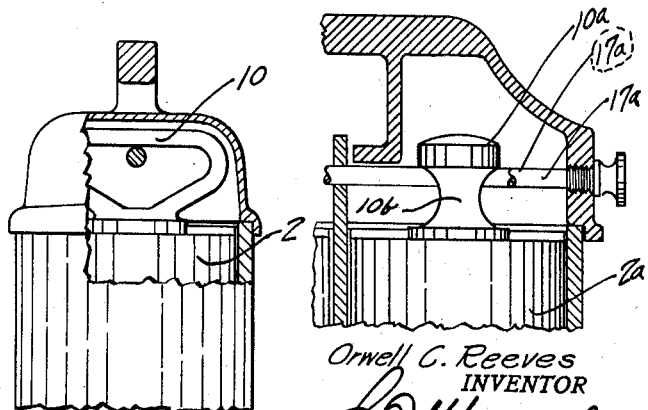
FIG. III　　　FIG. IV
Orwell C. Reeves
INVENTOR
BY　*C. D. Marshall*
ATTORNEY Patented Aug. 22, 1933

1,923,457

UNITED STATES PATENT OFFICE 1,923,457

TEST WEIGHT CASE

Orwell C. Reeves, Toledo, Ohio, assignor to Toledo Scale Manufacturing Company, Toledo, Ohio, a Corporation of New Jersey Application November 3, 1930. Serial No. 492,962

2 Claims. (Cl. 206—1)

This invention relates to means for protecting test weights during shipment and in storage. Such test weights are used in balancing and testing scales. When a scale is installed in a warehouse, factory or other mercantile establishment, it is customary for the mechanic making such installation to carry with him a sufficient number of standard weights to test the scale to its maximum capacity. As some of these scales have a very high capacity, it is quite a task to transport the weights and they are necessarily subject to rough handling when they are loaded and unloaded in and from the trucks; which often results in that the edges of the weights are chipped or otherwise marred. Atmospheric conditions also tend to destroy their accuracy through rust and corrosion and it is therefore necessary that these weights are frequently tested and resealed. The obvious method of packing these weights into boxes for shipment is unsatisfactory as the boxes for the purpose must be very strong and it follows that their bulk and weight makes this method impracticable in transportation.

The primary object of this invention is therefore the provision of a test weight container of light construction.

A further object is the provision of a test weight container which is adapted to be easily handled in transportation.

Another object is the provision of a test weight container which is so designed as to obviate the necessity of a construction having great strength.

A still further object is the provision of means for locking such container to the test weight.

Other objects and advantages will be apparent from the following description and the accompanying drawing illustrating a preferred embodiment of my invention.

In the drawing:—

Figure I is a plan view, a portion being broken away of my improved test weight case.

Figure II is a side elevational view partially in section.

Figure III is a fragmentary end elevation partially in section; and

Figure IV is a fragmentary sectional side elevation showing the invention adapted to a differently designed test weight.

A case 1 which for sake of economy is preferably molded from a synthetic resin, a strong fiber product, or light aluminum casting is adapted to receive one or more test weights 2 and 3. This case 1 has an upstanding partition member 4 which is secured to the bottom of the case 1 and projects above the walls and is provided with an aperture 5 in the projecting part. A cover 6 which is preferably a light aluminum casting is provided with a handle portion 7 and is also provided with pockets 8 and 9 which are adapted to fit over the handles 10 and 11 of the weights 2 and 3. Parallel walls which form these pockets are provided with apertures 12, 13, 14 and 15.

After the weights are in the case and the cover 6 placed on top, the projecting portion of the member 4 projects through the opening 16 and the aperture 5 therein will be aligned with the apertures 12, 13, 14 and 15 in the walls of the pockets 8 and 9 and a bolt like member 17 is adapted to pass through the apertures and the weight handles 10 and 11. The distance between the bottom of the case and the bolt is so calculated that when the latter is inserted the mass of the test weights is suspended from the bolt and do not rest on the bottom of the case 1. The portion of the bolt member 17 immediately underneath the head is slightly larger in diameter and provided with threads which engage corresponding threads tapped into the walls of the aperture, thus the case and the cover are securely locked to the weight or weights.

A slightly different form of construction is shown in Figure IV. The weight 2a instead of being provided with a loop handle has a knob 10a and two bolts 17a are provided to retain the cover in a similar manner and to support the test weight. These bolts in this case are adapted to pass just below the enlarged portion of the knob, one on either side of the stem 10b.

These cases are preferably made to carry two test weights of the 50 lb. size as shown in the illustration for ease in transportation; although for smaller weights, these cases may be made to receive any reasonable number.

It should be clear from the description of the illustrated embodiment of this invention that when the case 1 and the cover 6 are locked to the weight by means of the member 17, the entire mass of the weights is suspended from the handle and the case is merely a protective covering which requires no particular strength and can be made very light.

The embodiment of my invention herein shown and described is to be regarded as illustrative only and it is to be understood that the invention is susceptible to variation, modification and change within the spirit and scope of the subjoined claims.

Having described my invention, I claim:—

1. In a test weight case, a body of light material for the reception of test weights having loop-like handles, said body having a bottom, walls and a member secured to the bottom and extending above said walls, a cover adapted to rest on said walls, said cover having pockets to receive the loop-like handles of such test weights, aligned openings in walls forming said pockets and said member extending above said walls and a bolt like member adapted to pass through said aligned apertures and through said loop-like handles so that such test weights are suspended from said cover.

2. In a test weight case, a case of light material for the reception of test weights having handles, said case having a bottom, walls and a member secured to the bottom and extending above said walls, a cover adapted to rest on said walls, said cover having pockets to receive the handles of such test weights, a plurality of sets of aligned openings in parallel walls forming said pockets and said member extending above said walls and a bolt-like member adapted to pass through said aligned apertures and engaging said test weight handles so that such test weights are suspended from said cover.

ORWELL C. REEVES.